J. A. ALEXANDER & F. K. BERRY.
STOVE DOOR.
APPLICATION FILED MAR. 29, 1912.
1,060,808.
Patented May 6, 1913.
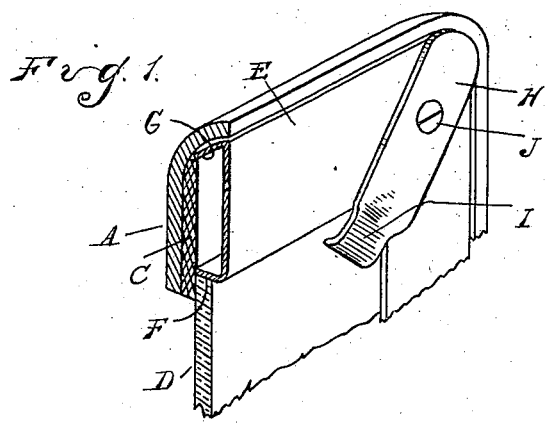
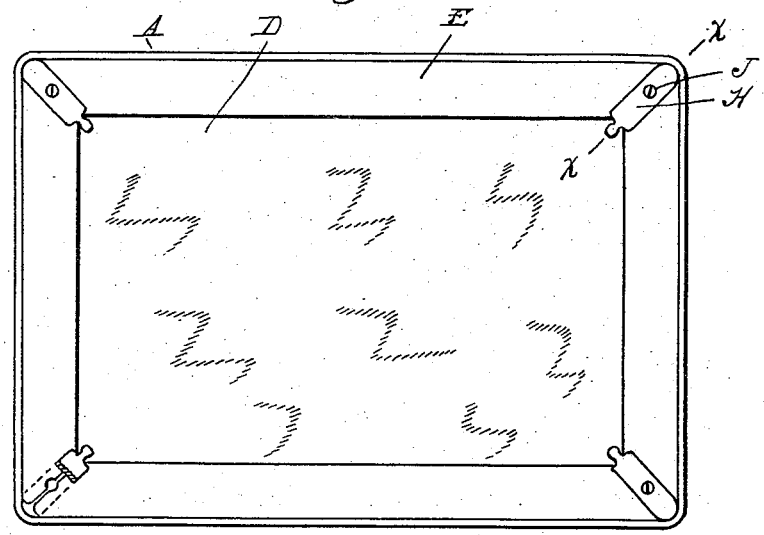
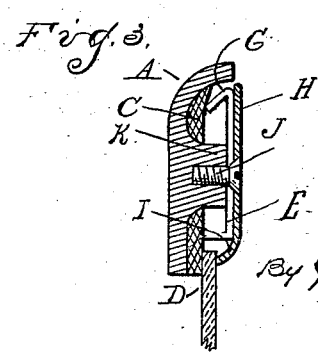
Inventors.
John A. Alexander, &
Frank K. Berry,
Witnesses
W. K. Ford
James O. Barry
Attys.

UNITED STATES PATENT OFFICE.

JOHN A. ALEXANDER AND FRANK K. BERRY, OF BATTLE CREEK, MICHIGAN, ASSIGNORS TO A. B. STOVE COMPANY, OF BATTLE CREEK, MICHIGAN, A CORPORATION OF MICHIGAN.

STOVE-DOOR.

1,060,808. Specification of Letters Patent. Patented May 6, 1913.

Application filed March 29, 1912. Serial No. 687,036.

*To all whom it may concern:*

Be it known that we, JOHN A. ALEXANDER and FRANK K. BERRY, citizens of the United States of America, residing at Battle Creek, in the county of Calhoun and State of Michigan, have invented certain new and useful Improvements in Stove-Doors, of which the following is a specification, reference being had therein to the accompanying drawings.

The invention relates to stove doors and particularly to that type in which a transparent panel is used.

The invention consists in the means employed for securing the transparent panel to the door frame, and further in the peculiar construction, arrangement and combination of parts as hereinafter set forth.

In the drawings,—Figure 1 is a sectional perspective view showing a portion of the door frame and the panel securing means; Fig. 2 is a rear elevation of the door frame and panel; Fig. 3 is a cross section on line x—x Fig. 2.

The frame of the door A is preferably formed of cast metal and is of a rectangular form having the central opening for the transparent panel. The outer portion of this frame is curved inward into the plane of the stove front against which it seats, while the inner edge is in a different plane, as shown in Fig. 1.

C is a cushioning lining for the frame A lying adjacent to the inner face thereof and which forms a yieldable seat for the transparent panel D. This panel is slightly larger than the opening in the frame so as to have a marginal bearing thereon on all sides, while the yielding cushion C will form a seat conforming to the shape of the panel.

E are sheet metal strips bent into a channel shape and forming spacers for the transparent panel and also liners for the frame A. These strips have square shoulders F at their inner edges against which the edge of the transparent panel bears, while at their outer edges the flange G is fashioned to fit within the curved portion of the frame A. For securing the panel, a plurality of clips H are employed, preferably one at each corner of the frame, these clips being arranged to overlap the ends of the panel members E and having projecting fingers I which bear against the corner portions of the transparent panel. The clips H may be secured by screws J engaging threaded lugs K on the frame.

The construction described is one which can be cheaply manufactured, easily assembled, and in case of breakage of the transparent panel it may be removed and replaced without difficulty.

What we claim as our invention is:

1. In a door, the combination with an outer frame, of a transparent panel seated in said frame, spacer strips between said panel and the outer edge of the frame, and clips for holding said spacer strips in position provided with fingers bearing on said panel to retain the same.

2. In a door, the combination with an outer frame, of a lining therefor of soft heat insulating material, a transparent panel marginally seated upon said lining, spacers between the edge of said panel and the outer edge of the frame, and clips for securing said spacers and bearing against said panel.

3. In a door, the combination with an outer frame, of a panel having a marginal bearing upon said frame, spacer strips upon the opposite sides of the frame between the edge of said panel and the outer edge of the frame, and corner clips for securing said spacers to the frame and provided with fingers bearing against said panel to retain the same.

4. In a door, the combination with a frame, of a panel having a marginal seat on the inner edge of said frame and spacer strips formed of sheet metal bent into a channel section, one flange of said channel forming a shoulder for the edge of said panel and the other flange lying adjacent to the outer edge of said frame, and clips at the corners of said frame overlapping the ends of said strips to secure them from displacement and provided with finger bearings for retaining the panel.

In testimony whereof we affix our signatures in presence of two witnesses.

JOHN A. ALEXANDER.
FRANK K. BERRY.

Witnesses:
P. C. DE VOL,
MAE HUSTED.

---

Copies of this patent may be obtained for five cents each, by addressing the "Commissioner of Patents, Washington, D. C."